(12) United States Patent
Rivard

(10) Patent No.: US 9,221,504 B2
(45) Date of Patent: Dec. 29, 2015

(54) MOBILE STABILIZATION DEVICE

(71) Applicant: Louis-Philippe Rivard, Ste-Marthe-sur-le-Lac (CA)

(72) Inventor: Louis-Philippe Rivard, Ste-Marthe-sur-le-Lac (CA)

(73) Assignee: 8287872 Canada Inc., Ste-Marthe-sur-le-Lac ( * ) Notice: Subject to any disclaimer, the term of this patent is extended or adjusted under 35 U.S.C. 154(b) by 0 days.

(21) Appl. No.: 14/386,347

(22) PCT Filed: Jun. 25, 2013

(86) PCT No.: PCT/CA2013/000599
§ 371 (c)(1),
(2) Date: Sep. 19, 2014

(87) PCT Pub. No.: WO2014/000089
PCT Pub. Date: Jan. 3, 2014

(65) Prior Publication Data
US 2015/0097361 A1 Apr. 9, 2015

(30) Foreign Application Priority Data
Jun. 27, 2012 (GB) .................................. 1211363.5

(51) Int. Cl.
*B62D 37/04* (2006.01)
(52) U.S. Cl.
CPC ...................................... *B62D 37/04* (2013.01)
(58) Field of Classification Search
CPC ...................................................... B62D 37/04
USPC ........................................................ 701/124
See application file for complete search history.

(56) References Cited

U.S. PATENT DOCUMENTS

| | | | | |
|---|---|---|---|---|
| 3,277,840 A | * | 10/1966 | Li | ................... 105/145 |
| 3,525,306 A | * | 8/1970 | Bubic et al. | ..................... 104/95 |
| 4,763,800 A | | 8/1988 | Engler et al. | |
| 5,653,173 A | * | 8/1997 | Fischer | ......................... 104/124 |
| 6,702,050 B1 | * | 3/2004 | Mazhar | ........................... 180/10 |
| 8,019,514 B2 | * | 9/2011 | Yuet et al. | ....................... 701/50 |
| 2002/0145333 A1 | | 10/2002 | Faye | |
| 2008/0084111 A1 | * | 4/2008 | Rainer | ......................... 305/124 |
| 2009/0206589 A1 | | 8/2009 | Osswald | |
| 2011/0022267 A1 | | 1/2011 | Murphy | |
| 2011/0164928 A1 | | 7/2011 | Homsi | |

FOREIGN PATENT DOCUMENTS

CN           2372202 Y   *  4/2000
WO     WO 0204259 A         1/2002

OTHER PUBLICATIONS

International Search Report for PCT/CA2013/000599.

* cited by examiner

*Primary Examiner* — Paul N Dickson
*Assistant Examiner* — Darlene P Condra
(74) *Attorney, Agent, or Firm* — Benoît & Côté Inc.

(57) ABSTRACT

A mobile stabilization device consists of at least one linear gear forming a track adapted to be securely attached to a vehicle. A movable counterweight member including at least one gear that is adapted to cooperate with at least one linear gear and thereby move linearly along the track, and a servo-motor attached between the counterweight member and at least one gear for actuating and rotating at least one gear thereon and hence along the track. An inclination detector adapted to determine the inclination of the vehicle and send signals to at least one servo-motor and at least one of the counterweight's gears to thereby move the counterweight along the track to a position that would increase the stability of the vehicle.

20 Claims, 7 Drawing Sheets

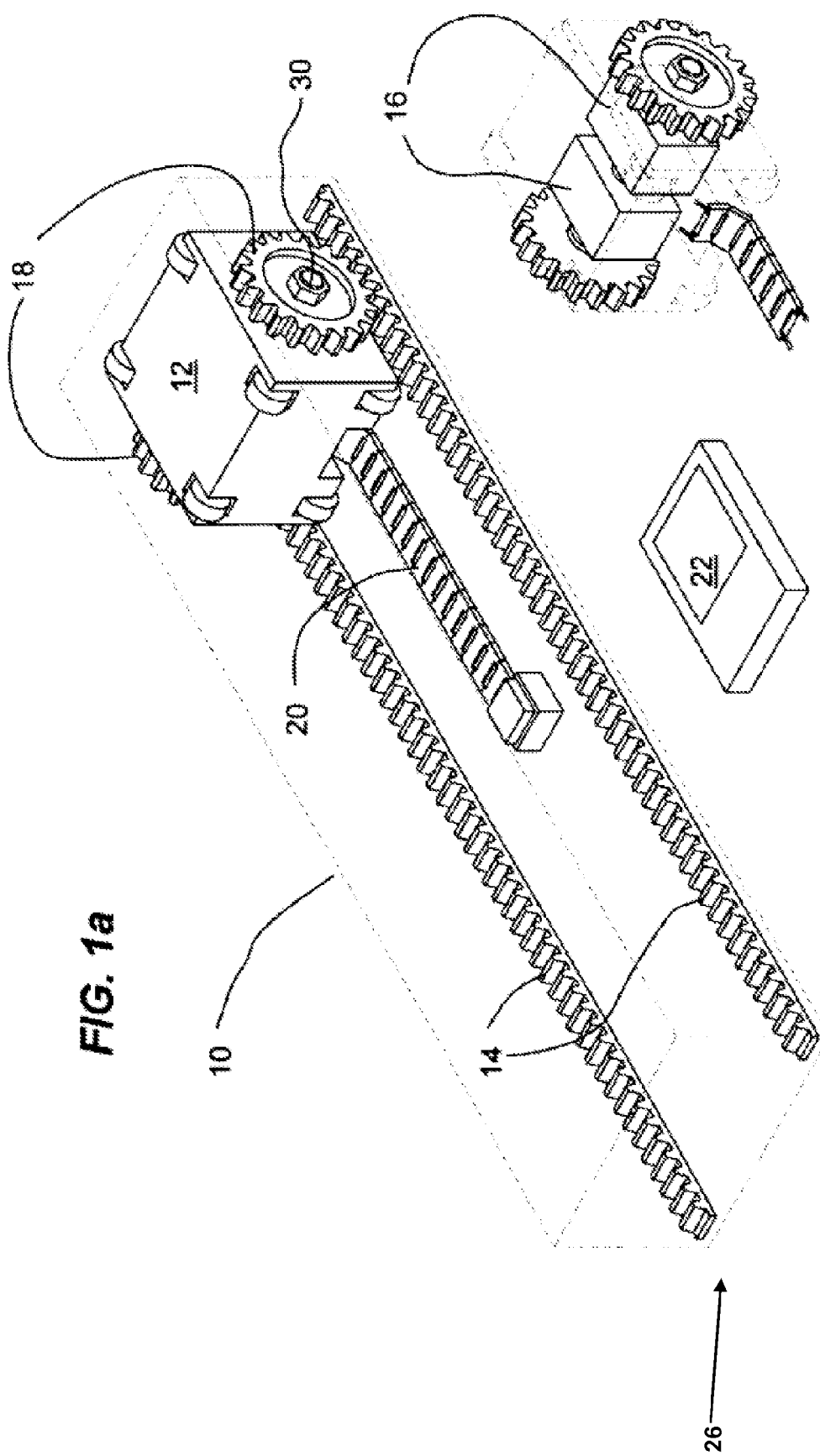

MOBILE STABILIZATION DEVICE

FIELD OF THE INVENTION

The present invention relates generally to motor vehicle accessories but more particularly to a system that improves the stabilisation of any type of vehicles by overcompensating.

BACKGROUND OF THE INVENTION

Many vehicles but more particularly some types of off road vehicles are used in ways that push the limits of safety. Sometimes the vehicles tip over because they run on terrain that is too inclined or because the vehicle takes a turn at too great a speed. There needs to be a way to better stabilize the vehicle.

SUMMARY OF THE INVENTION

In view of the foregoing disadvantages inherent in the known devices now present in the prior art, the present invention, which will be described subsequently in greater detail, is to provide objects and advantages which are:

To provide for a system that over compensates in one direction so as to provide enhanced stability to any type of vehicle whether on the ground, the air or on water. This system can be used to ensure passengers' comfort, on a boat to eliminate roll or in sports car, or simply to stabilize an object being lifted up high. It therefore has multiple fields of use.

In order to do so, the invention comprises of at least one linear gear forming a track adapted to be securely attached to a vehicle. A movable counterweight member including at least one gear that is adapted to cooperate with one linear gear and thereby move linearly along the track, and a servo-motor attached between the counterweight member and at least one gear for actuating and rotating at least one gear thereon and hence along the track. An inclination detector adapted to determine the inclination of the vehicle and send signals to at least one servo-motor and at least one of the counterweight's gear to thereby move the counterweight along the track to a position that would increase the stability of the vehicle.

In a preferred embodiment, the track is formed as a continuous circular or linear track, to thereby be adapted to provide a series of positions in lateral and longitudinal directions upon the length and width of a vehicle.

The stabilization device further includes a power strap attached to the counterweight and adapted to provide power to at least one of the counterweight's servo-motors.

The inclination detector includes electronic circuitry hardware which is equipped with software to calculate the inclination of the vehicle and send this information by way of signals to the counterweight and at least one servo-motors to move the counterweight to a particular position along the track and to thereby increase the stability of the vehicle.

In a preferred embodiment, there are two linear gears, two gears, and two servo-motors.

The continuous circular track is formed of a central axis, wherein the gears of the counterweight member define a rotational axis, such that the rotational axis of the gears is perpendicular to the central axis of the circular track.

The continuous circular track is formed of a central axis, wherein the gears of the counterweight member define a rotational axis, such that the rotational axis of the gears is parallel to the central axis of the circular track.

The stabilization device is further comprised of a rotation mechanism adapted to rotationally connect the track to the vehicle, to thereby adapt the device to provide a series of positions of the counterweight member in lateral and longitudinal directions upon the length and width of the vehicle, and thereby increase the stability of the vehicle when needed.

The mobile stabilization device works in combination with a vehicle.

There have thus been outlined, rather broadly, the most important features of the invention in order for the following detailed description be better understood, and in order for the present contribution to the art be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 1a-b Isometric view of the invention and see through view of the counterweight and hardware.

DETAILED DESCRIPTION OF THE PREFERRED EMBODIMENT

Figure 2A:
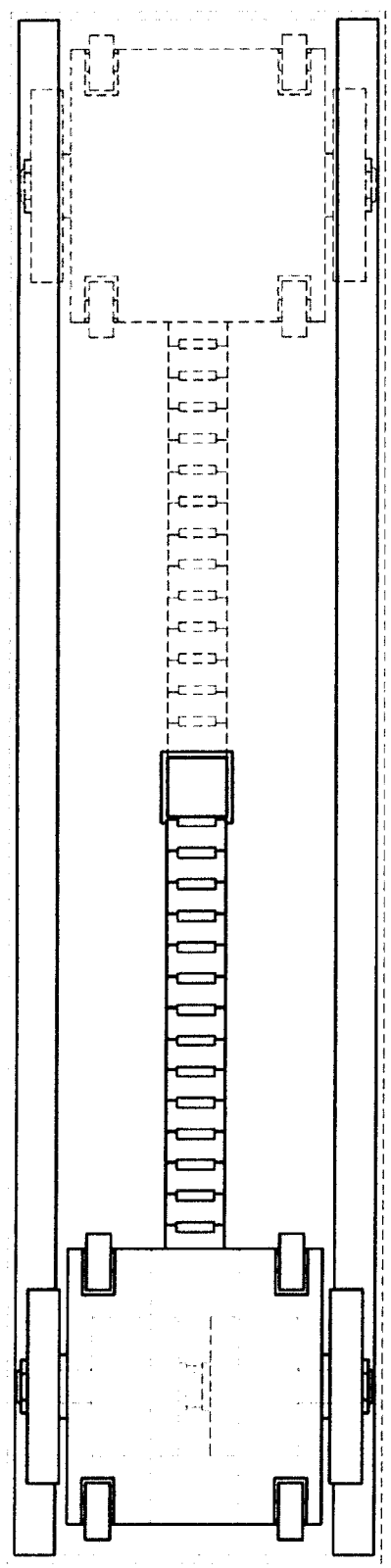
FIGS. 2a-b Top and side see through views of the invention.
Figure 2B:
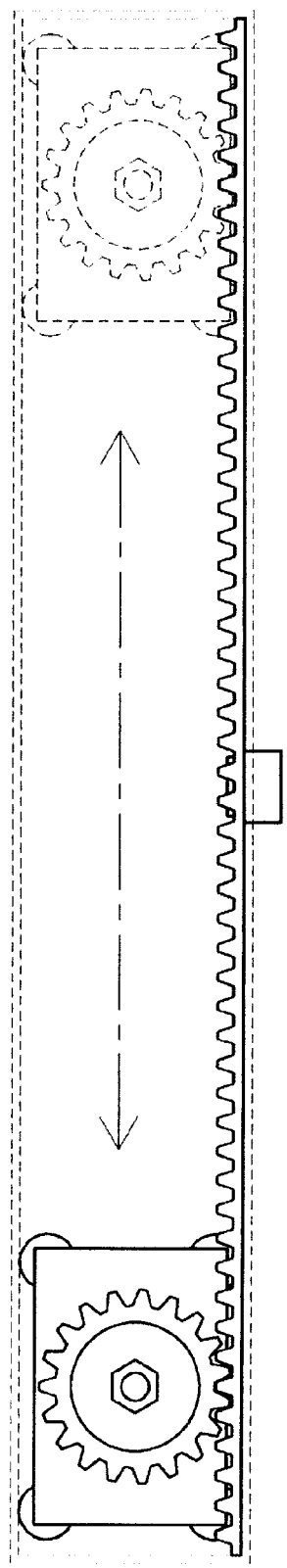
Figure 3A:
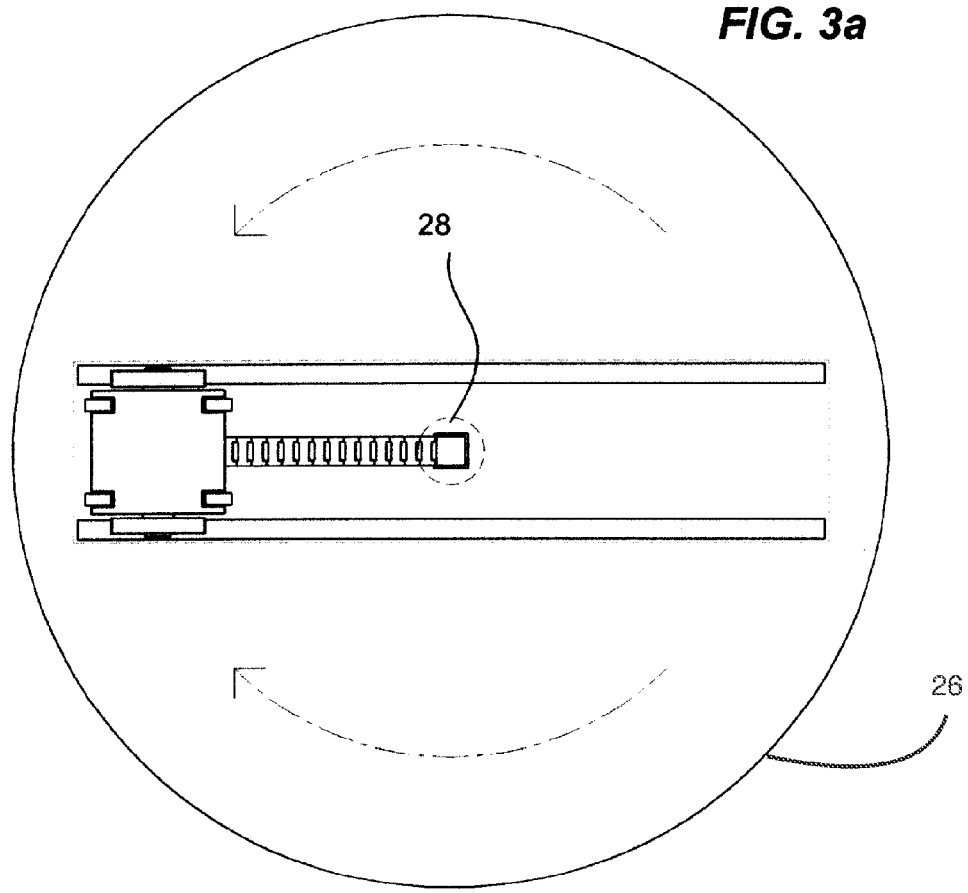
FIGS. 3a-b Top and side see through views of the invention with a circular track.
Figure 3B:
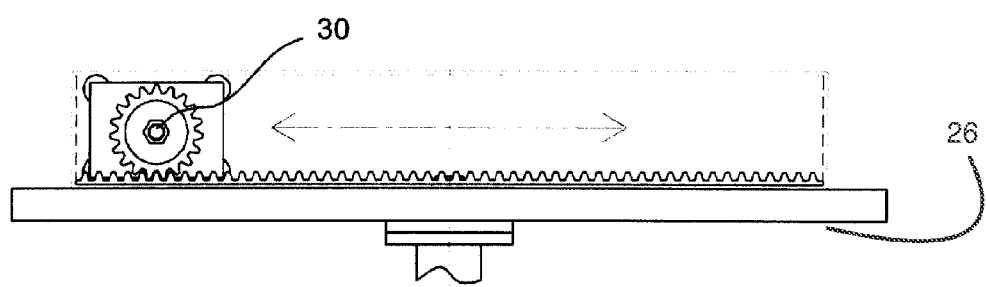
Figure 4:
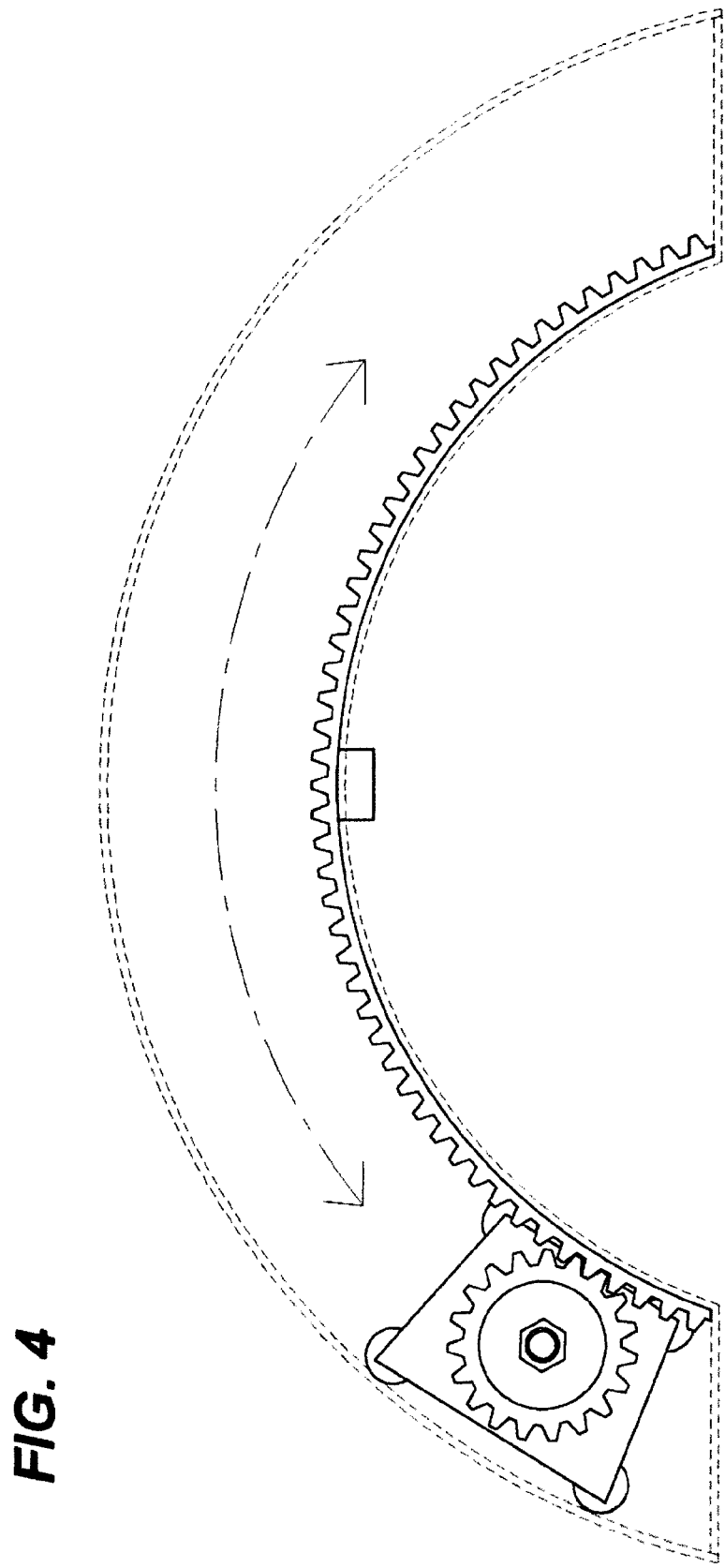
FIG. 4 See through side view of a vertical semi circle straight track.
Figure 5:
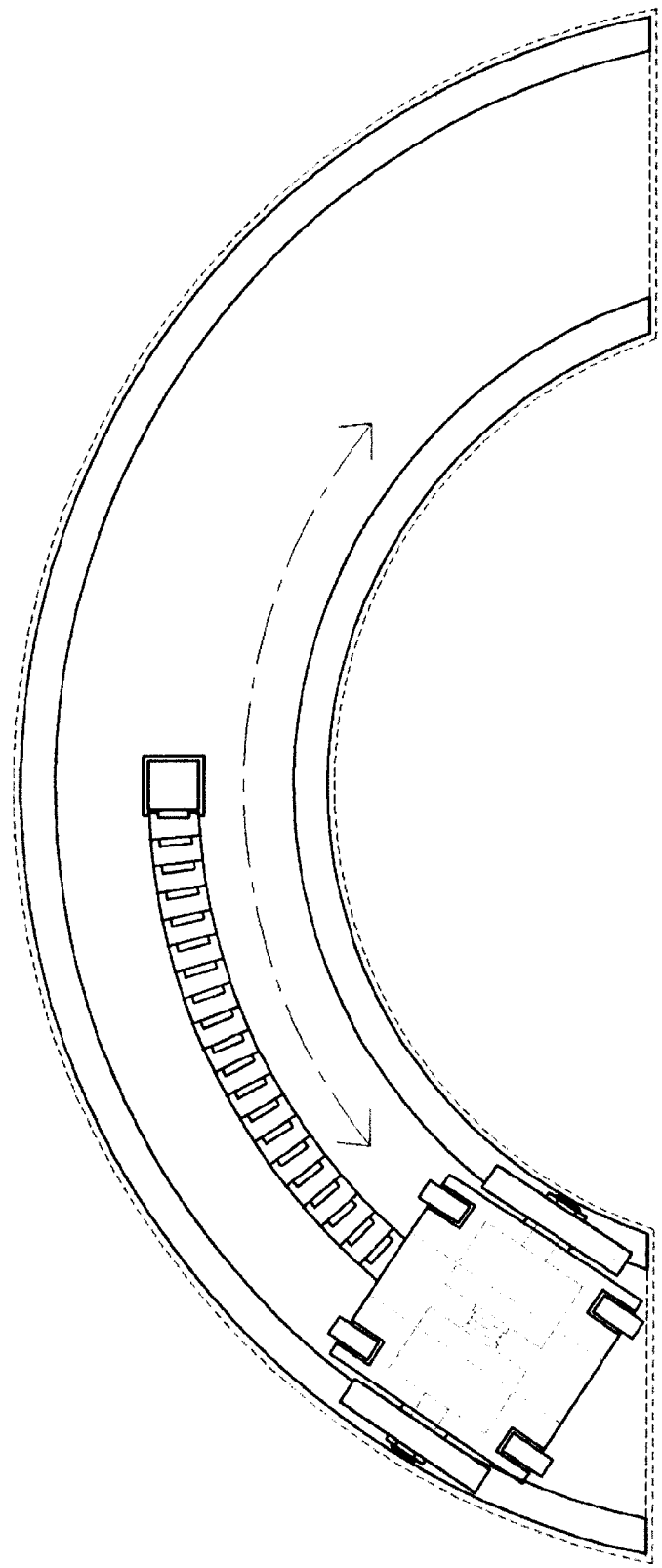
FIG. 5 See through side view of a horizontal semi circle curved track.
Figure 6B:
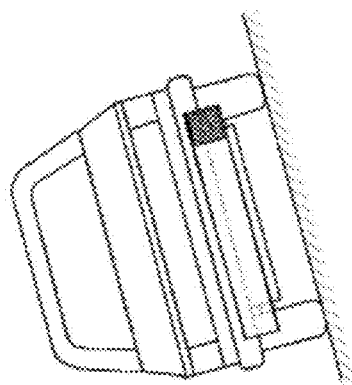
FIGS. 6a-d Examples of how the weight is repositioned underneath a vehicle.
Figure 6D:
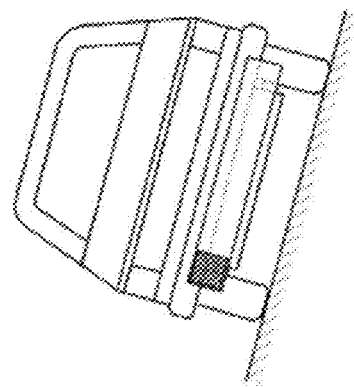
Figure 6A:
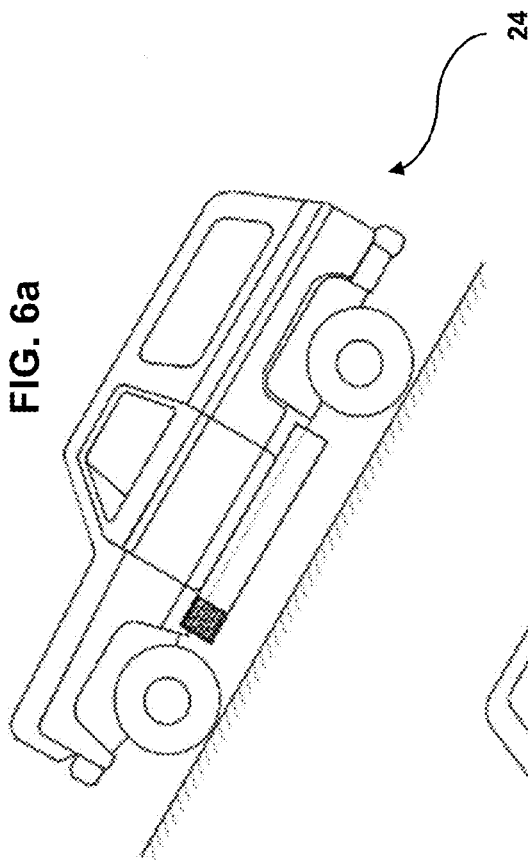
Figure 6C:
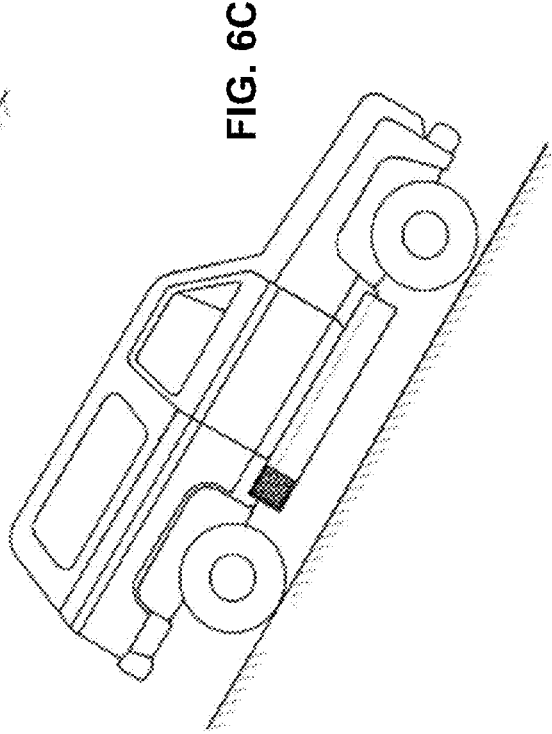

A mobile stabilisation device (10) comprises at least one linear gear (14) forming a track (26) adapted to be securely attached to a vehicle (24). A movable counterweight member (12) including at least one gear (18) that is adapted to cooperate with at least one linear gear (14) and thereby move linearly along the track (26), and a servo-motor (16) attached between the counterweight member (12) and at least one gear

(18) for actuating and rotating the at least one gear (18) thereon and hence along the track (26). An inclination detector (22) adapted to determine the inclination of the vehicle (24) sends signals to at least one servo-motor (16) and at least one gear (18) of the counterweight (12) to thereby move it along the track (26) to a position that increases the stability of the vehicle (24).

In a preferred embodiment, the track (26) is formed in a continuous circular fashion so as to be adapted to provide a series of positions in lateral and longitudinal directions upon the length and width of the vehicle (24).

The stabilization device (10) further includes a power strap (20) attached to the counterweight (12) and adapted to provide power to at least one servo-motor (16) of the counterweight member (12).

The inclination detector (22) includes electronic circuitry hardware which is equipped with software to calculate the inclination of the vehicle (24) and send this information by way of signals to the counterweight (12) and at least one servo-motor (16) to move the counterweight to a particular position along the track (26) to thereby increase the stability of the vehicle (24). The inclination detector (22) is preferably attached to a protected part of the vehicle (24) frame (not shown).

In a preferred embodiment, there are two linear gears (14), two gears (18), and two servo-motors (16).

The continuous circular track (26) is formed of a central axis (28), wherein the gears (18) of the counterweight member (12) define a rotational axis (30), such that the rotational axis (30) of the gears (18) is perpendicular to the central axis of the circular track (26).

The counterweight (12) is actuated by at least one servo-motor (16) that actuates a gear (18). The gear (18) cooperates with a linear gear (14).

An inclination detector (22) detects whether there is a risk of the vehicle tipping over and sends a signal to the servo-motor (16). A flexible power strap (20) provides power to the servo-motor (16) all throughout its range of motion. Special software handles the calculations. This type of software and hardware can be integrated inside of the inclination detector (22).

Figure 7:
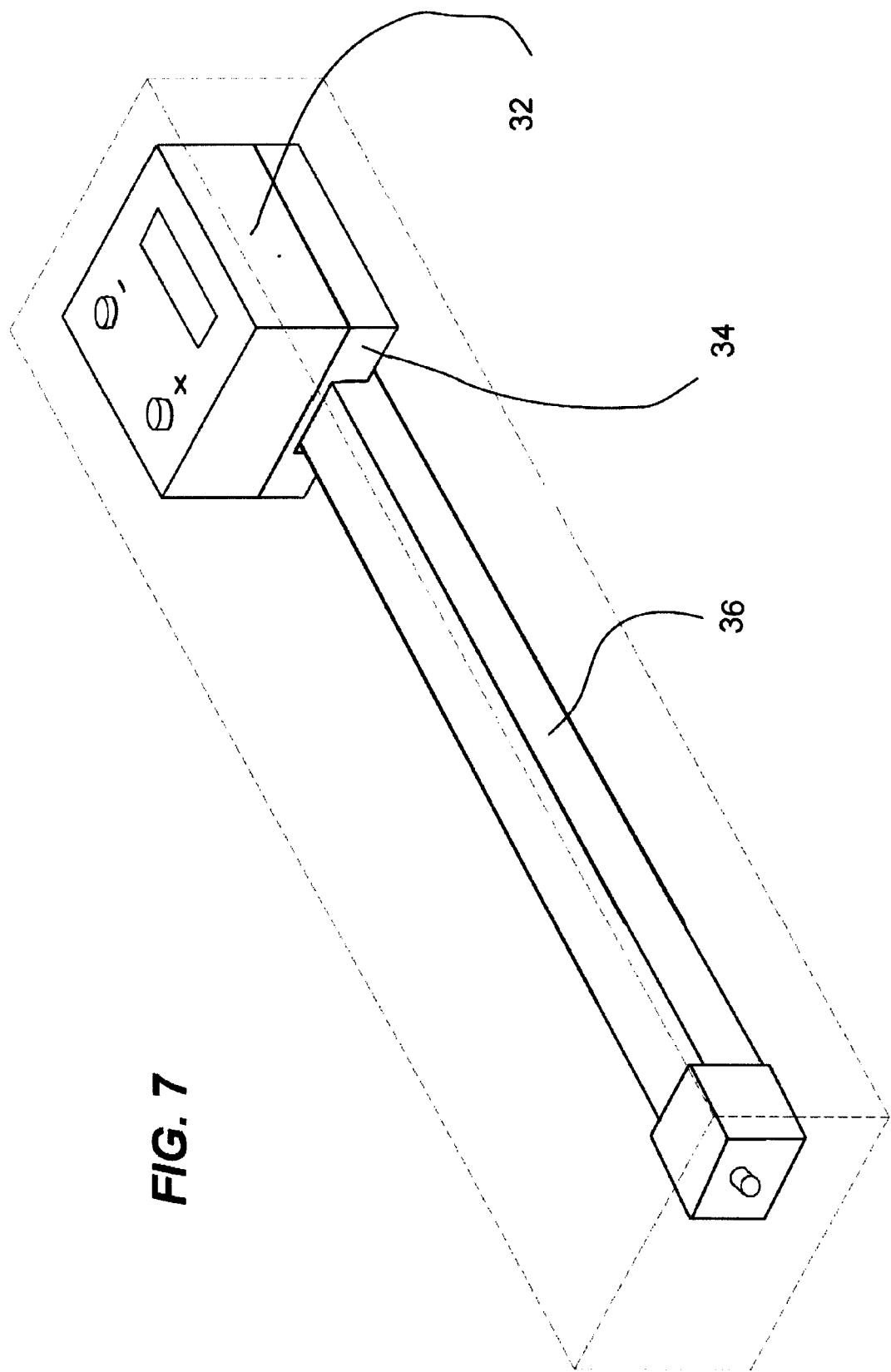
FIG. 7 Isometric view of the invention using a linear drive motor.

Also, any useful object can be used as a weight such as a heavy car battery (32), which could have a double purpose in this case. The linear gear (14) and its associated components such as the gear (18) can be replaced by a linear drive motor (34), and rail (36), as per FIG. 7 and still provide the same functionality. Linear drive motors (34) are known in the art and need not be further discussed herein.

As to a further discussion of the manner of usage and operation of the present invention, the same should be apparent from the above description. For example, electric motors and linear drive electric motors are discussed hereinabove but other obvious variants include pneumatic and hydraulic engines, much as steam or internal combustion engines, although the latter would be impractical, but could still be considered obvious variants. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A mobile stabilization device for a vehicle, said device comprising: at least one linear gear forming a track adapted to be securely attached to a vehicle; a counterweight member including at least one gear adapted to cooperate with said at least one linear gear and thereby move linearly along said track; a servo-motor directly attached to said counterweight member and for actuating and rotating said at least one gear and hence the servo-motor and the counterweight member are configured to move together along said track; and an inclination detector adapted to determine an inclination of said vehicle and send signals to said servo-motor to thereby move said counterweight member along said track to a position that increases the stability of said vehicle.

2. The stabilization device of claim 1, wherein said track is formed as a continuous circular track, to thereby be adapted to provide a series of positions in lateral and longitudinal directions upon the length and width of a vehicle.

3. The stabilization device of claim 2, wherein said continuous circular track is formed having a central axis, and wherein said gears of said counterweight member define a rotational axis, such that said rotational axis of said gears is perpendicular to said central axis of said continuous circular track.

4. The stabilization device of claim 2, wherein said continuous circular track is formed having a central axis, and wherein said gears of said counterweight member define a rotational axis, such that said rotational axis of said gears is parallel to said central axis of said continuous circular track.

5. The stabilization device of claim 2, further comprising a rotation mechanism adapted to rotationally connect said track to said vehicle, to thereby adapt said device to provide a series of positions of said counterweight member in lateral and longitudinal directions upon the length and width of said vehicle, and thereby increase the stability of said vehicle when needed.

6. The stabilization device of claim 1, further including a power strap attached to said counterweight member and adapted to provide power to said at least one servo-motor of said counterweight member.

7. The stabilization device of claim 1, wherein said inclination detector includes electronic circuitry hardware equipped with software installed therein to calculate the inclination of said vehicle and send information within said signals to said counterweight member and at least one of said servo-motors to move to a particular position along said track to thereby increase said stability of said vehicle.

8. The stabilization device of claim 1, wherein there are two said linear gears, two said gears, and two said servo-motors.

9. The stabilization device of claim 1, further comprising a rotation mechanism adapted to rotationally connect said track to said vehicle, to thereby adapt said device to provide a series of positions of said counterweight member in lateral and longitudinal directions upon the length and width of said vehicle, and thereby increase the stability of said vehicle when needed.

10. The stabilization device of claim 1, wherein said track is formed as one of a vertical semi circle straight track and a horizontal semi circle curved track.

11. A combination of a vehicle and a mobile stabilization device, said combination comprising: a vehicle including a bottom side having a length and a width; and a mobile stabilization device comprising: at least one linear gear forming a track adapted to be securely attached to said bottom side of said vehicle; a counterweight member including at least one gear adapted to cooperate with said at least one linear gear and thereby move linearly along said track; a servo-motor directly attached to said counterweight member and for actuating and rotating said at least one gear and hence the servo-motor and the counterweight member are configured to move together along said track; and an inclination detector adapted to determine an inclination of said vehicle and send signals to said servo-motor to thereby move said counterweight member along said track to a position that increases the stability of said vehicle.

12. The combination of claim 11, wherein said track is formed as a continuous circular track, to thereby be adapted to provide a series of positions in lateral and longitudinal directions upon the length and width of said bottom side of said vehicle.

13. The combination of claim 12, wherein said continuous circular track is formed having a central axis, and wherein said gears of said counterweight member define a rotational axis, such that said rotational axis of said gears is perpendicular to said central axis of said continuous circular track.

14. The combination of claim 12, wherein said continuous circular track is formed having a central axis, and wherein said gears of said counterweight member define a rotational axis, such that said rotational axis of said gears is parallel to said central axis of said continuous circular track.

15. The combination of claim 12, further comprising a rotation mechanism adapted to rotationally connect said track to said vehicle, to thereby adapt said device to provide a series of positions of said counterweight member in lateral and longitudinal directions upon the length and width of said bottom side of said vehicle, and thereby increase the stability of said vehicle when needed.

16. The combination of claim 11, further including a power strap attached to said counterweight member and adapted to provide power to at least one of said servo-motors of said counterweight member.

17. The combination of claim 11, wherein said inclination detector includes electronic circuitry hardware having software installed therein to calculate the inclination of said vehicle and send information within said signals to said counterweight member and at least one of said servo-motors to move to a particular position along said track to thereby increase said stability of said vehicle.

18. The combination of claim 11, wherein there are two said linear gears, two said gears, and two said servo-motors.

19. The combination of claim 11, further comprising a rotation mechanism adapted to rotationally connect said track to said vehicle, to thereby adapt said device to provide a series of positions of said counterweight member in lateral and longitudinal directions upon the length and width of said bottom side of said vehicle, and thereby increase the stability of said vehicle when needed.

20. A mobile stabilization device for a vehicle, the device comprising:
    a rail adapted to be securely attached to a vehicle;
    a linear drive motor adapted to move linearly along the rail;
    a counterweight member directly attached to the linear drive motor; and
    an inclination detector configured to determine an inclination of the vehicle and send signals to the linear drive motor to thereby move the counterweight member and the linear drive motor together along the rail to a position that increases the stability of the vehicle.

* * * * *